United States Patent
Ohnishi et al.

(10) Patent No.: US 11,719,789 B2
(45) Date of Patent: Aug. 8, 2023

(54) OPTICAL PROXIMITY SENSOR AND PORTABLE TERMINAL APPARATUS FOR ADJUSTING DEGREE OF FREEDOM IN ARRANGEMENT POSITION

(71) Applicant: SHARP KABUSHIKI KAISHA, Sakai (JP)

(72) Inventors: Masaya Ohnishi, Sakai (JP); Morito Kanamoto, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 552 days.

(21) Appl. No.: 16/715,870

(22) Filed: Dec. 16, 2019

(65) Prior Publication Data
US 2020/0191920 A1 Jun. 18, 2020

Related U.S. Application Data

(60) Provisional application No. 62/781,426, filed on Dec. 18, 2018.

(51) Int. Cl.
G01S 7/481 (2006.01)
G01S 17/08 (2006.01)
G01S 17/04 (2020.01)

(52) U.S. Cl.
CPC .......... *G01S 7/4813* (2013.01); *G01S 7/4816* (2013.01); *G01S 17/04* (2020.01); *G01S 17/08* (2013.01)

(58) Field of Classification Search
CPC ...... G01S 7/4816; G01S 17/08; G01S 7/4813; G01S 17/04; G01V 8/12; H04M 1/026; H04M 2250/12
See application file for complete search history.

(56) References Cited

U.S. PATENT DOCUMENTS

| | | | |
|---|---|---|---|
| 10,418,507 B2* | 9/2019 | Ohno | H01L 25/167 |
| 2010/0181578 A1* | 7/2010 | Li | H01L 31/153 257/E31.095 |
| 2011/0133941 A1 | 6/2011 | Yao et al. | |
| 2013/0019459 A1* | 1/2013 | Lim | H03K 17/941 29/592.1 |
| 2017/0345961 A1* | 11/2017 | Shentu | H01L 31/02005 |
| 2018/0143346 A1 | 5/2018 | Wang | |

(Continued)

FOREIGN PATENT DOCUMENTS

| | | |
|---|---|---|
| CN | 106847802 A | 6/2017 |
| CN | 108073305 A | 5/2018 |

(Continued)

*Primary Examiner* — Jennifer D Bennett

(74) *Attorney, Agent, or Firm* — ScienBiziP, P.C.

(57) ABSTRACT

An optical proximity sensor that increases a degree of freedom in an arrangement position is provided. The optical proximity sensor includes: a light detecting unit comprising a light detecting element on a substrate, a first transparent unit that covers the light detecting element, and a light-shielding unit that covers the first transparent unit; and a light emitting unit comprising a light emitting element on the substrate, a second transparent unit that covers the light emitting element, and the light-shielding unit that covers the second transparent unit, in which the light-shielding unit causes at least any of the first transparent unit and the second transparent unit to be exposed from a side surface of a package of the optical proximity sensor.

6 Claims, 16 Drawing Sheets

(56) References Cited

U.S. PATENT DOCUMENTS

2018/0188105 A1    7/2018  Huang
2019/0139951 A1*  5/2019  T'ng ..................... G01J 3/0262

FOREIGN PATENT DOCUMENTS

| CN | 108333639 A  | 7/2018 |
|----|--------------|--------|
| JP | 2011-180121 A | 9/2011 |
| JP | 2018-091797 A | 6/2018 |

* cited by examiner

1: PORTABLE TERMINAL APPARATUS
10: OPTICAL PROXIMITY SENSOR WINDOW
11: DISPLAY/INPUT SCREEN
12: SPEAKER
13: SUB CAMERA
14: BEZEL (FRAME)
15: HOUSING

1: PORTABLE TERMINAL APPARATUS
10: OPTICAL PROXIMITY SENSOR WINDOW
16: IN HOUSING: OPTICAL PROXIMITY SENSOR
17: DETECTION LIGHT
18: REFLECTED LIGHT

1: PORTABLE TERMINAL APPARATUS
10: OPTICAL PROXIMITY SENSOR WINDOW
11: DISPLAY/INPUT SCREEN
12: SPEAKER
13: SUB CAMERA
14: BEZEL (FRAME)
15: HOUSING

1A: PORTABLE TERMINAL APPARATUS
11: DISPLAY/INPUT SCREEN
13A: STORABLE SUB CAMERA
14: BEZEL (FRAME)
15: HOUSING

5: OPTICAL PROXIMITY SENSOR
50: LIGHT DETECTING ELEMENT
51: LIGHT EMITTING ELEMENT
52: TRANSPARENT RESIN
53: TRANSPARENT RESIN
54: LIGHT-SHIELDING RESIN
55: SUBSTRATE
56: LIGHT DETECTING UNIT
57: LIGHT EMITTING UNIT
58: WINDOW
59: WINDOW

7: OPTICAL PROXIMITY SENSOR
70: LIGHT DETECTING ELEMENT
72: TRANSPARENT RESIN
74: LIGHT-SHIELDING RESIN
75: SUBSTRATE
78: WINDOW

7A: OPTICAL PROXIMITY SENSOR
70: LIGHT DETECTING ELEMENT
71: LIGHT EMITTING ELEMENT
72: TRANSPARENT RESIN
73: TRANSPARENT RESIN
74: LIGHT-SHIELDING RESIN
75: SUBSTRATE
76: LIGHT DETECTING UNIT
77: LIGHT EMITTING UNIT
78: WINDOW
79: WINDOW

7(7A): OPTICAL PROXIMITY SENSOR
70: LIGHT DETECTING ELEMENT
72: TRANSPARENT RESIN
74: LIGHT-SHIELDING RESIN
75: SUBSTRATE
78: WINDOW
144: SIGNAL LIGHT

7B: OPTICAL PROXIMITY SENSOR
70: LIGHT DETECTING ELEMENT
72: TRANSPARENT RESIN
74: LIGHT-SHIELDING RESIN
75: SUBSTRATE
78: WINDOW
154: SIGNAL LIGHT

OPTICAL PROXIMITY SENSOR AND PORTABLE TERMINAL APPARATUS FOR ADJUSTING DEGREE OF FREEDOM IN ARRANGEMENT POSITION

TECHNICAL FIELD

The present invention relates to an optical proximity sensor that is used in a portable terminal apparatus such as a smartphone, and a portable terminal apparatus that incorporates the optical proximity sensor.

BACKGROUND ART

A portable terminal apparatus such as a smartphone is mostly equipped with a proximity sensor in order to prevent a malfunction during a call, and in a case where a part of a face comes close to the portable terminal during the call, the proximity sensor functions to turn off a function of an input screen of a touch panel or the like. As the proximity sensor, there is an optical proximity sensor, an ultrasonic proximity sensor, an electrostatic capacitance proximity sensor, or the like, and the optical proximity sensor excellent in detection accuracy, is most frequently used. The optical proximity sensor is generally constituted by a light emitting unit that emits infrared light and a light detecting unit, and in a case where light emitted from the light emitting unit is reflected by an object to be detected, the reflected light is detected by the light detecting unit, and an amount of the detected light reaches a predetermined value or more, the optical proximity sensor determines that the object is in proximity. Accordingly, in the conventional portable terminal such as a smartphone, the proximity sensor is arranged on a display screen side to which the part of the face comes close during the call.

(Example of Configuration of Conventional Portable Terminal Apparatus)

FIGS. 1 and 2 illustrate a conventional portable terminal apparatus. FIG. 1 is a view of a conventional portable terminal apparatus 1 such as a smartphone, as seen from a direction of a display/input screen 11, and an optical proximity sensor window 10, a speaker 12, and a sub camera 13 are arranged on a side of the display/input screen 11. The display/input screen 11 is incorporated in a housing 15 and surrounded by an edge part of the housing 15. Note that, the edge part of the housing 15 serves as a bezel (frame) 14. Moreover, as illustrated in FIG. 2, an optical proximity sensor 16 is arranged at a position inside the housing 15, which corresponds to a depth side of the optical proximity sensor window 10. Detection light 17 emitted from the optical proximity sensor 15 passes through the optical proximity sensor window 10, and is emitted vertically to a surface of the display/input screen 11 of the portable terminal apparatus 1. The detection light 17 is radiated to an object to be detected and reflected by the object to be detected. In a case where reflected light 18 reflected by the object to be detected is detected by the optical proximity sensor 16 and an amount of the detected light exceeds a predetermined light detection amount, the optical proximity sensor 16 determines that the object to be detected is in proximity to the portable terminal apparatus 1. In general, the optical proximity sensor 16 is often set to determine that the object to be detected is in proximity in a case where a distance to the object to be detected becomes about 2 to 4 cm. That is, the optical proximity sensor 16 is able to detect the proximity of the object to be detected without contact.

As above, the optical proximity sensor is generally configured to be arranged in a bezel part. For example, PTL 1 proposes an infrared sensor in which a light detecting element and a window of a package are arranged to be deviated from each other and first and second mirrors are installed so that an infrared ray incident from the window is caused to be incident on the light detecting element. PTL 2 discloses a configuration in which a window for a light detecting element is arranged near a side surface of a package and the side surface is also covered with metal or the like.

CITATION LIST

Patent Literature

[PTL 1] Japanese Unexamined Patent Application Publication No. 2018-91797
[PTL 2] Japanese Unexamined Patent Application Publication No. 2011-180121

SUMMARY OF INVENTION

Technical Problem

In a recent smartphone, a display screen has been enlarged and further, bezel-less has been realized because of emphasis on design. The bezel-less means that a width of a bezel (frame) around a display screen is reduced. Left and right side bezel-less is now common in a bezel of a display screen of a high-end model smartphone, and upper and lower side bezel-less is also progressed in some models. Here, a problem is posed in arrangement of a sub camera, a proximity sensor, and a speaker.

(Another Example of Configuration of Conventional Portable Terminal Apparatus)

FIG. 3 illustrates another example of the conventional portable terminal apparatus 1 such as a smartphone. The present portable terminal apparatus 1 includes the display/input screen 11 with a large size, the optical proximity sensor window 10, the speaker 12, and the sub camera 13, and has the bezel (frame) 14 narrower than that of the example of FIGS. 1 and 2. In order to increase a size of the display/input screen 11 as much as possible in arrangement, the sub camera 13, the speaker 12, and the optical proximity sensor window 10 are arranged so as to penetrate into a notch that is provided in the display/input screen 11, so that improvement of design is required.

(Example of Ideal Arrangement in Portable Terminal Apparatus)

FIG. 4 illustrates ideal arrangement in a portable terminal apparatus 1A such as a smartphone. The portable terminal apparatus 1A includes the display/input screen 11 with a full screen, and the housing 15, and has the bezel 14 having no place in which a sub camera, a speaker, and a proximity sensor are arranged.

The speaker is able to be eliminated from the bezel by transmitting sound to a human body without a speaker by a method of bone conduction or the like, and the sub camera is also able to be eliminated from the bezel, for example, by a method of storing the sub camera in the housing 15 similarly to a sub camera 13A in the figure. The proximity sensor is required to function during a call and is very frequently used, and is thus difficult to be provided in a storable manner as the sub camera. Thus, the proximity sensor is required to be arranged on the side of the display/input screen 11 where sensing is allowed constantly. In order to solve such a problem, a configuration is considered, for example, in which an ultrasonic proximity sensor, which detects proximity of an object to be detected by using an ultrasonic wave, is used. The ultrasonic proximity sensor has an advantage that the ultrasonic proximity sensor is not required to be arranged on the side of the display/input screen 11, but the ultrasonic system has a disadvantage of poorer accuracy than that of the optical system, so that companies are not prompted to adopt the ultrasonic system. On the other hand, a method of realizing the bezel-less is not proposed for the optical proximity sensor, so that a proximity sensor which corresponds to a narrow bezel is required.

(Example of Configuration of Conventional Optical Proximity Sensor)

FIG. 5 is a plan view of a conventional optical proximity sensor 5 and a sectional view taken along a line A-A' of the plan view. The conventional proximity sensor 5 includes a light detecting unit 56 and a light emitting unit 57, and a light detecting element 50 of the light detecting unit 56 and a light emitting element 51 of the light emitting unit 57 are arranged in a straight line on a substrate 55, and the light detecting element 50 and the light emitting element 51 are respectively covered with transparent resin 52 and transparent resin 53. Moreover, the transparent resin 52 and the transparent resin 53 are covered with light-shielding resin 54 to shield light.

In the light-shielding resin 54 above the light detecting element 50 and the light emitting element 51, a window 58 and a window 59 are respectively formed, and the light detecting element 50, the light emitting element 51, the window 58, and the window 59 are arranged in a straight line on a package center line. Furthermore, a structure in which the transparent resin other than parts which correspond to windows is covered with the light-shielding resin so that only an object to be detected in a window direction is detected is provided.

(Example of Arrangement of Conventional Optical Proximity Sensor in Portable Terminal Apparatus)

FIG. 6 is a sectional view of a portable terminal apparatus 6, such as a smartphone, which is equipped with the conventional optical proximity sensor 5 described with use of FIG. 5. Portable terminal apparatus 6 of FIG. 6 is constituted by an input/display device 60, a housing 61, and the optical proximity sensor 5, and in a bezel 64 part of the housing 61, a housing window 63 is installed so that detection light of the optical proximity sensor 5 passes through the housing window 63 and reflected light from an object to be detected is detected. Note that, in the following description, the detection light and the reflected light are collectively called signal light.

As illustrated in FIG. 6, in the portable terminal apparatus 6 that uses the conventional optical proximity sensor 5, the optical proximity sensor 5 is arranged so that a center (center of a window) of a package of the optical proximity sensor 5 is matched with a center of the housing window 63 of the portable terminal apparatus 6. Note that, in the following description, a direction of a straight line connecting the center of the optical proximity sensor 5 and the center of the housing window 63 is set as a vertical direction, and a direction perpendicular to the vertical direction is set as a horizontal direction. For example, a width of the housing window 63 in the horizontal direction corresponds to X4 in the figure. In FIG. 6, in a case where a width of the bezel 64 from the center of the housing window 63 to the input/display device 60 is set as Y and a width of the bezel 64 from the center of the housing window 63 to a peripheral edge is set as X, the width X and the width Y are required to be reduced in order to narrow a width of the bezel.

In the width Y, a width Y1 from the center of the package of the optical proximity sensor 5 to a peripheral edge on a side of the input/display device 60 does not matter because the input/display device 60 and the optical proximity sensor 5 are able to be overlapped. It is possible to set the width Y to any width as long as the input/display device 60 does not interfere with signal light of the optical proximity sensor 5. Thus, it is important for the width of the bezel to reduce the width X from the center of the housing window 63 to the peripheral edge of the housing 61. As illustrated in FIG. 6, the width X is decided according to a package width X1, a gap X2, and a housing width X3. Here, the package width X1 indicates a horizontal width from the center of the package of the optical proximity sensor 5 to an end thereof in a direction toward an outside of the portable terminal apparatus 6. The gap X2 indicates a horizontal width from the end of the proximity sensor 5 to an inner wall surface of the housing 61, and the housing width X3 is a width (thickness) of the housing 61 in the horizontal direction.

X1 is also required to be reduced together with X2 and X3 in order to reduce the width X, and the optical proximity sensor 5 is required to reduce the width X1. As described above, it is difficult to say that the width X1 is sufficiently small in the conventional optical proximity sensor 5, resulting that the bezel part is difficult to be narrowed.

(Problem in Conventional Optical Proximity Sensor)

FIG. 6A is a front view of the conventional optical proximity sensor 5 and a sectional view taken along a line A-A' of the front view. As illustrated in the sectional view, the light emitting element 51 that is arranged on the substrate is covered with the transparent resin 53 and the light-shielding resin 54. Circular part placed near the light emitting element 51 indicates the window 59 that is installed above the light emitting element 51, and in a part which corresponds to the window, there is no light-shielding resin 54 and the transparent resin 53 is exposed. In other words, as illustrated in the front view, the optical proximity sensor 5 is configured such that the transparent resin 53 and the light emitting element 51 that is covered with the transparent resin 53 are able to be visually confirmed through the window 53 that is provided in the light-shielding resin 54. As illustrated in the sectional view, the package width X1 which needs to be reduced is decided according to a size of the light emitting element 51 and widths of the transparent resin 53 and the light-shielding resin 54, and is provided by the following by adding a taper part necessary for resin molding to the size and the widths.

$$X1 = a + b + b' + c + c'$$

Here, the respective signs indicate the followings.
a: length of light emitting element in A-A' direction/2
b: thickness necessary for transparent resin 53
b': thickness of taper of transparent resin 53
c: thickness of light-shielding resin 54 in horizontal direction
c': length of gap generated by taper of light-shielding resin 54

Here, the taper indicates a resin part which is molded at an inclination as illustrated in the figure. Resin molding is performed in such a manner that an element is sealed by a die, resin is poured thereto, the resin is hardened, and then, the optical proximity sensor 5 is drawn out from the die. Therefore, when the optical proximity sensor 5 that is molded is drawn out, the molded part needs to be inclined to reduce friction so that the optical proximity sensor 5 is easily drawn out. Accordingly, the taper is required in both of the transparent resin 53 and the light-shielding resin 54.

As a result, in order to reduce X1, it is necessary to reduce b or c that is thickness necessary for the resin, or reduce b' or c' that is the taper necessary for resin molding.

As a method of reducing the width X1, it is considered that the width c that corresponds to the thickness of the light-shielding resin 54 is reduced by eliminating a part of the light-shielding resin 54, for example. However, in the optical proximity sensor 5 which is installed inside the housing of the portable terminal apparatus 6 has a problem of noise light (stray light), such as crosstalk light, which is described below.

(Relationship Between Optical Proximity Sensor and Crosstalk Light)

FIG. 6B illustrates a relationship between the optical proximity sensor 5 and crosstalk light. As described above, the optical proximity sensor 5 is installed inside the housing of the portable terminal apparatus 6, and projects or detects signal light through a glass panel 63a that constitutes the housing window 63 of FIG. 6, and detects an object to be detected outside. Note that, a light-shielding member 63b may be provided on the glass panel 63a so as to restrict a region through which the signal light passes. A light ray A in the figure is detection light by which an object to be detected is detected, and the light ray A passes through the glass panel 63a of the housing window 63 and is radiated to the object to be detected. A part of the light ray A is reflected by a surface of the object to be detected, and then passes through the glass panel 63a of the housing window 63 again, and is detected by the light detecting element 50.

A light ray B is light obtained by a part of the light ray A being reflected by a plane C of the glass panel 63a, and the light ray B is called crosstalk light. In a case where the light ray B is incident on the light detecting element 50, since the light detecting element 50 detects signal light of a certain amount regardless of whether the object to be detected exists, a detection operation in the optical proximity sensor 5 becomes unstable. Thus, in the conventional optical proximity sensor 5, in order to avoid entrance of the crosstalk light, which is obtained when the light ray A emitted by the light emitting element 51 is reflected by the plane C of the glass panel 63a, into the light detecting element 50, light is shielded by the light-shielding resin 54.

(Improvement Example of Conventional Optical Proximity Sensor)

FIG. 6C is a sectional view of a package structure of an optical proximity sensor 5A in which the light-shielding resin 54 on a side surface of a package is eliminated to expose the transparent resin 52 in order to reduce the package width X1 in the conventional optical proximity sensor 5. The present sensor has a configuration in which the light detecting element 50, the transparent resin 52, the light-shielding resin 54, and the substrate 55 are arranged and in order to reduce the package width X1, the light-shielding resin 54 does not cover a part of the transparent resin 52.

Moreover, arrows in the figure each indicate crosstalk light. As illustrated in the figure, since the crosstalk light is able to enter from a part in which the transparent resin 52 is exposed, the optical proximity sensor 5A based on the conventional one is not able to obtain a stable proximity function.

An aspect of the invention is made in view of the aforementioned problems, and aims to realize an optical proximity sensor in which a light emitting element and a light detecting element are arranged near a peripheral edge portion and which increases a degree of freedom in an arrangement position.

Solution to Problem (1) In order to solve the aforementioned problems, an optical proximity sensor according to an aspect of the invention is an optical proximity sensor that includes: a light detecting unit and a light emitting unit, in which the light detecting unit is constituted by a light detecting element installed on a substrate, a first transparent unit that covers the light detecting element, and a light-shielding unit that covers the first transparent unit, the light emitting unit is constituted by a light emitting element installed on the substrate, a second transparent unit that covers the light emitting element, and the light-shielding unit that covers the second transparent unit, the light detecting element and the light emitting element detect and emit signal light respectively through a first window and a second window, which are provided in the light-shielding unit and on an upper side of a package of the optical proximity sensor, and the light-shielding unit causes at least any of the first transparent unit and the second transparent unit to be exposed from a side surface of the package.

(2) Moreover, the optical proximity sensor according to an aspect of the invention has a configuration in which the side surface of the package is constituted by a plane perpendicular to the substrate, in addition to the configuration of (1) described above.

(3) Moreover, the optical proximity sensor according to an aspect of the invention has a configuration in which the side surface is constituted by a plane perpendicular to the first window, in addition to the configuration of (1) or (2) described above.

(4) Moreover, the optical proximity sensor according to an aspect of the invention has a configuration in which the first transparent unit is exposed from the side surface, in addition to the configuration of (1), (2) or (3) described above.

(5) Moreover, the optical proximity sensor according to an aspect of the invention has a configuration in which the first transparent unit has an incident surface with a predetermined angle with respect to a light detecting surface of the light detecting element such that the signal light incident on the first transparent unit through the first window is incident on the light detecting element, in addition to the configuration of (1), (2), (3), or (4) described above.

(6) Moreover, a portable terminal apparatus according to an aspect of the invention includes the optical proximity sensor having the configuration of (1), (2), (3), (4), or (5) described above.

Advantageous Effects of Invention

According to an aspect of the invention, it is possible to realize an optical proximity sensor that increases a degree of freedom in an arrangement position.

BRIEF DESCRIPTION OF DRAWINGS

FIG. 9(b) illustrates a molding method of the optical proximity sensor of the invention.

DESCRIPTION OF EMBODIMENTS

Embodiment 1

(Example of Configuration of Optical Proximity Sensor of Invention)

Figure 7:
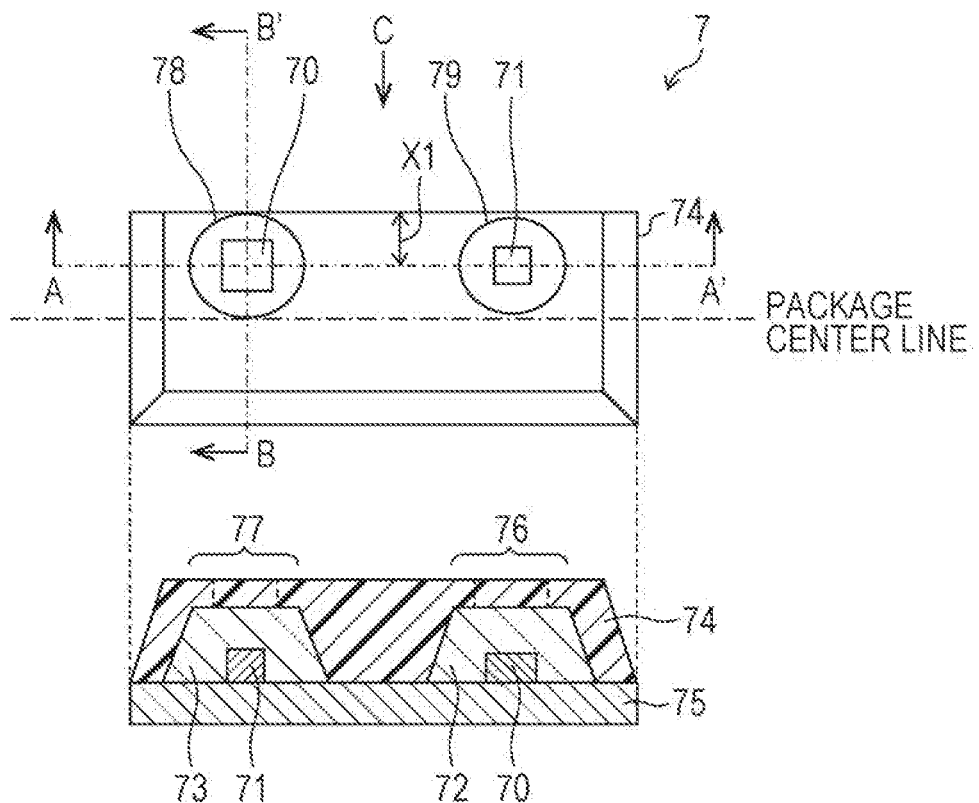
FIG. 7 is a front view of an optical proximity sensor of the invention and a side view thereof as seen from a direction C.

An optical proximity sensor 7 according to Embodiment 1 of the invention is illustrated in FIG. 7 below. FIG. 7 is a plan view of the optical proximity sensor 7 and a side view thereof as seen from a direction C. The optical proximity sensor 7 illustrated in FIG. 7 includes a light detecting unit 76 and a light emitting unit 77. The light detecting unit 76 is constituted by a light detecting element 70 that is installed on a substrate 75, transparent resin 72 that is a first transparent unit covering the light detecting element 70, and light-shielding resin 74 that is a light-shielding unit covering the transparent resin 72. Moreover, the light emitting unit 77 is constituted by a light emitting element 71 that is installed on the substrate 75, transparent resin 73 that is a second unit covering the light emitting element 71, and the light-shielding resin 74 that is the light-shielding unit covering the transparent resin 73. Here, the substrate 75 is a circuit substrate in which the light detecting element 70 and the light emitting element 71 are arranged, and is, for example, a printed substrate. The light detecting element 70 is an element that converts light detected by a light detecting surface into an electric signal and outputs the resultant, and is constituted by, for example, a photodiode. The light emitting element 71 is an element that emits detection light from a light emitting surface as signal light, and is constituted by, for example, an LED (light-emitting diode). The transparent resin 72 and the transparent resin 73 are synthetic resin, for example, such as plastic, through which light including the signal light is transmitted. The light-shielding resin 74 is opaque resin that shields light including the signal light.

The light detecting element 70 and the light emitting element 71 are arranged in a straight line on the substrate 75, and are respectively covered with the transparent resin 72 and the transparent resin 73. Moreover, the transparent resin 72 and the transparent resin 73 are covered with the common light-shielding resin 74. As illustrated in the plan view, the light detecting element 70 and the light emitting element 71 detect and emit the signal light respectively through a window 78 as a first window and a window 79 as a second window, which are provided in the light-shielding resin 74 and on an upper side of a package of the optical proximity sensor 7.

As illustrated in the plan view, at least any of the transparent resin 72 and the transparent resin 73 is exposed from a side surface of the package of the optical proximity sensor 7. Furthermore, the light detecting element 70, the light emitting element 71, the window 78, and the window 79 are arranged to be in the straight line in the illustrated example, such a line A-A' is arranged near the side surface of the package, from which at least any of the transparent resin 72 and the transparent resin 73 is exposed. It is premised that the arrangement in the straight line here indicates approximate arrangement and is not necessarily required to achieve complete linearity. The side surface of the package, from which at least any of the transparent resin 72 and the transparent resin 73 is exposed, is constituted by a plane perpendicular to the substrate 75.

(Relationship Between Optical Proximity Sensor of Invention and Crosstalk Light)

Figure 8:
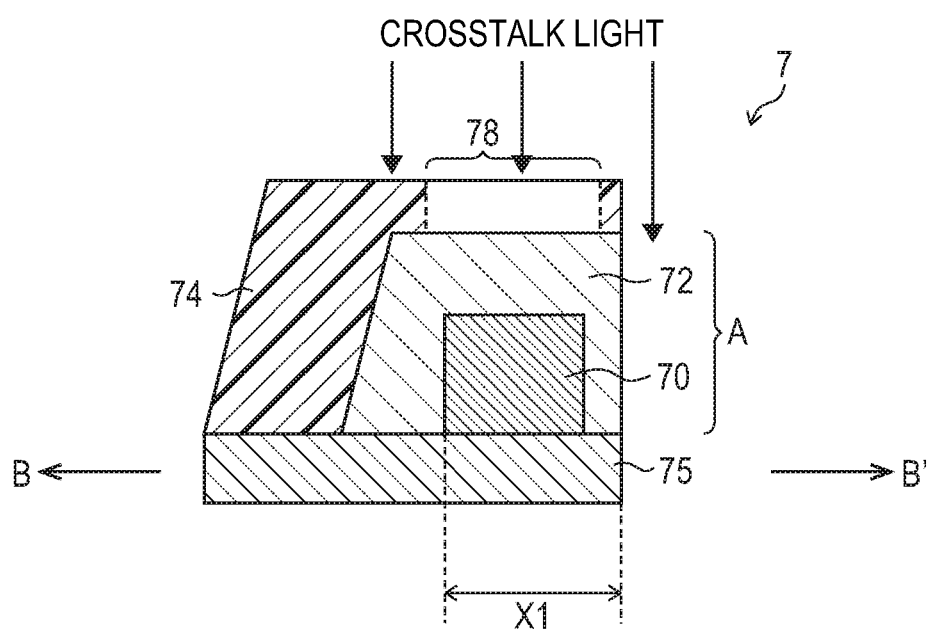
FIG. 8 is a sectional view of the optical proximity sensor of FIG. 7 taken along a line B-B'.

FIG. 8 is a sectional view of the optical proximity sensor 7 of FIG. 7 taken along a line B-B'. In the optical proximity sensor 7 of the invention here, the light detecting element 70, the transparent resin 72, the light-shielding resin 74, and the substrate 75 are illustrated and there is no light-shielding resin 74 on a part of the side surface of the package so that the transparent resin 72 is exposed, and an opening A is formed. The side surface of the package, on which the opening A is formed, is perpendicular to the substrate 75, and has no tapered structure. Thus, the crosstalk light described above dose not enter from the opening A, and stable proximity characteristics are able to be obtained.

The perpendicularity here indicates an angle at which the crosstalk light is not incident, and does not necessarily indicate complete perpendicularity. Moreover, there is no problem even when all four side surfaces of the package are perpendicular.

By applying the structure of the invention, the package width X is as follows, and is able to be a minimum width.

X1−(width of light detecting element/2 or width of
light emitting element/2)+(minimum width of
transparent resin)

Here, in a case where the light detecting element 70 is a light detecting IC in which a photodiode and a signal processing circuit are integrated, (width of light detecting element/2) is a distance from a center of the photodiode of the light detecting IC to an edge of the light detecting IC.

(Difference in Molding Method of Optical Proximity Sensor)

Figure 9:
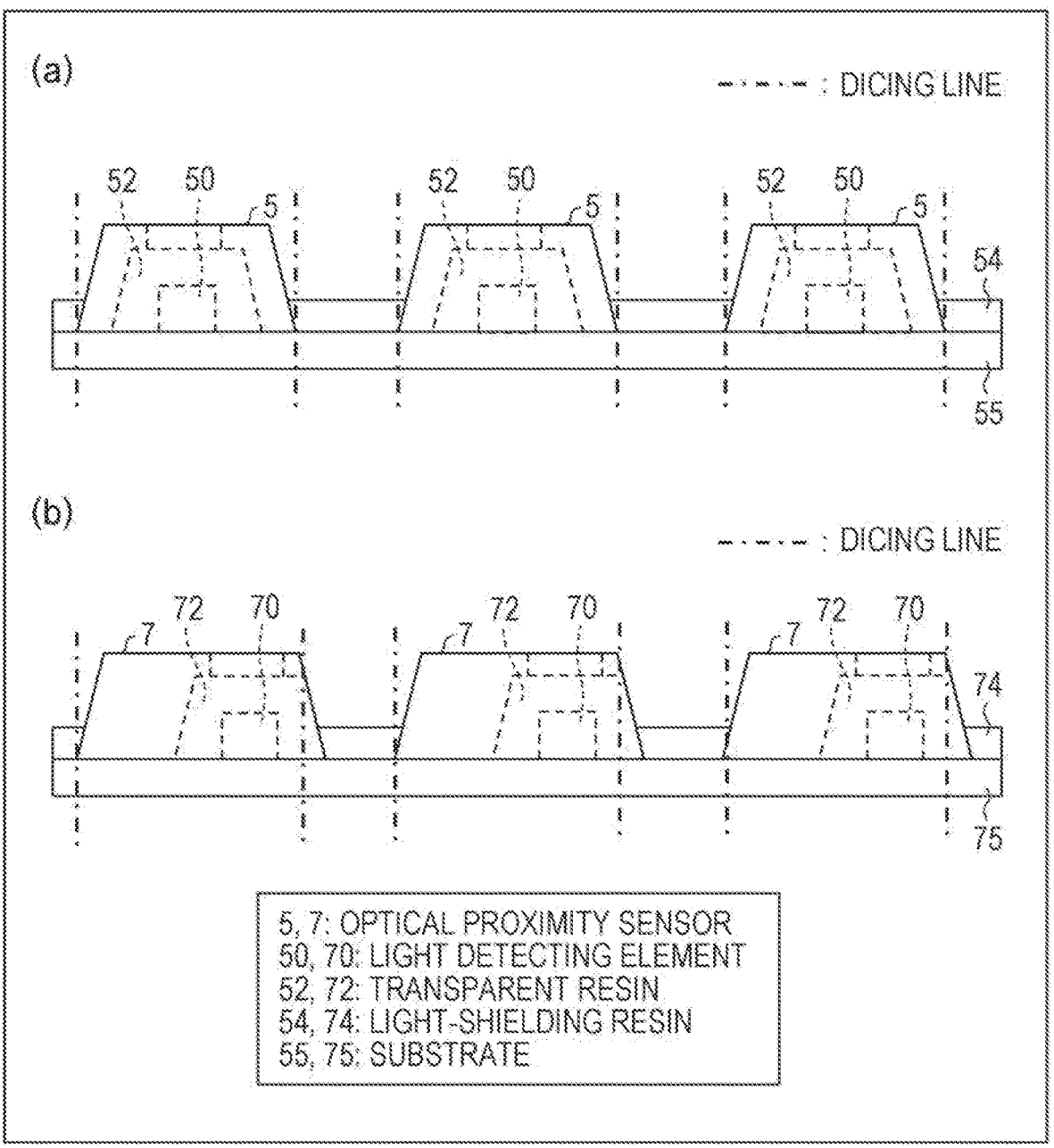
FIGS. 9(a) and 9(b) are schematic views illustrating molding methods of the conventional optical proximity sensor and the optical proximity sensor of the invention, in which FIG. 9(a) Illustrates a molding method of the conventional optical proximity sensor

FIG. 9 illustrates molding methods of the conventional optical proximity sensor 5 and the optical proximity sensor 7 of the invention. FIG. 9(a) illustrates a molding method of the conventional optical proximity sensor and FIG. 9(b) illustrates a molding method of the optical proximity sensor of the invention.

FIG. 9(a) illustrates the molding method of the conventional one, and a plurality of optical proximity sensors 5 are arranged on the substrate 55 and all the sensor are covered with the common light-shielding resin 54. A broken line indicates the transparent resin 52 and the light detecting element 50 inside the light-shielding resin, and an optical proximity sensor 5, which is cut into small pieces in a part of a one-dot chain line by dicing, is formed to have a taper.

On the other hand, in the optical proximity sensor 7 of the invention that is illustrated in FIG. 9(b), the transparent resin 72 and the light-shielding resin 74 are molded so that edge portions thereof are close to each other, and diced so that tapers of the edge portions are cut off.

Thereby, it is possible to arrange the window 78 of the optical proximity sensor 7 to be nearer to the side surface of the package, and by making the side surface of the package perpendicular to the substrate 75, it is possible to narrow a width of a bezel of a smartphone or the like without reducing tolerance against noise light.

(Example of Arrangement of Optical Proximity Sensor of the Invention in Portable Terminal Apparatus)

Figure 1:
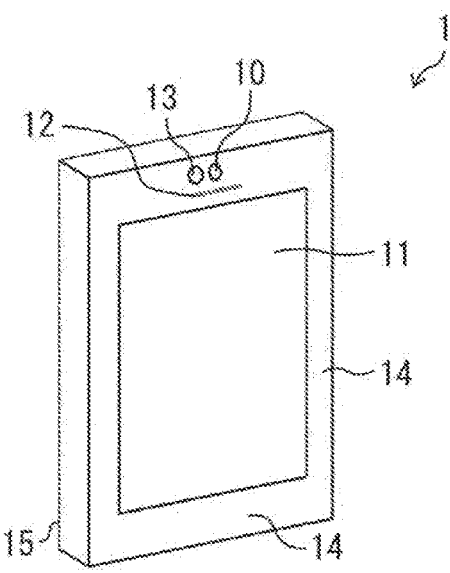
FIG. 1 is a schematic view illustrating appearance of a conventional portable terminal apparatus.
Figure 2:
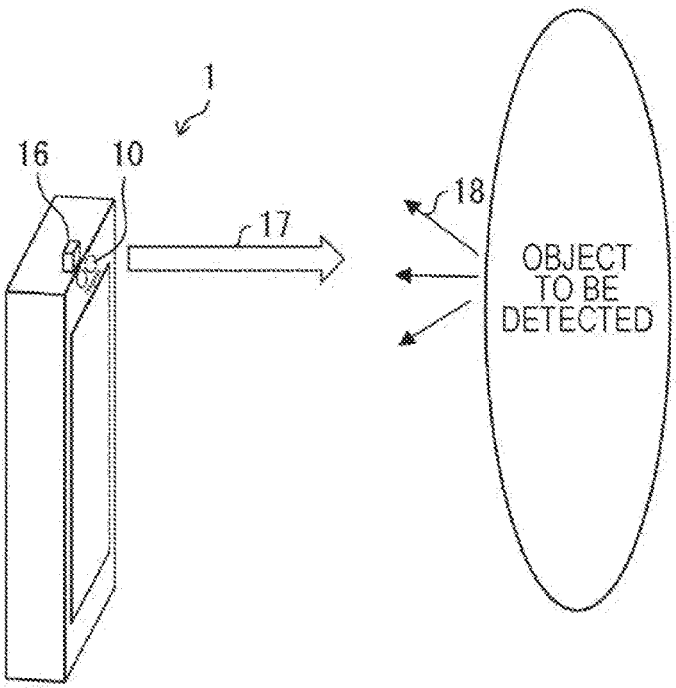
FIG. 2 is a schematic view illustrating an outline that the conventional portable terminal apparatus detects an object to be detected with use of a proximity sensor.
Figure 3:
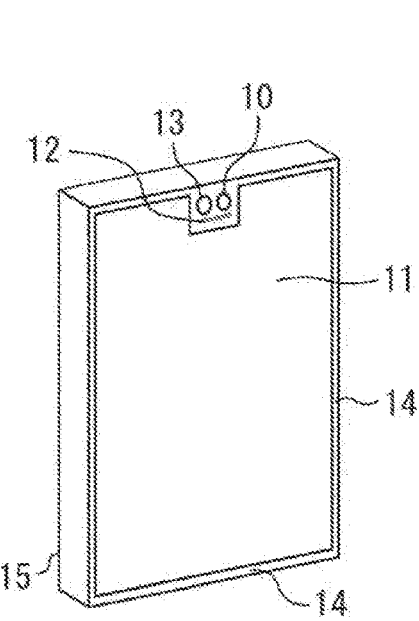
FIG. 3 is a schematic view illustrating another appearance of the conventional portable terminal apparatus.
Figure 4:
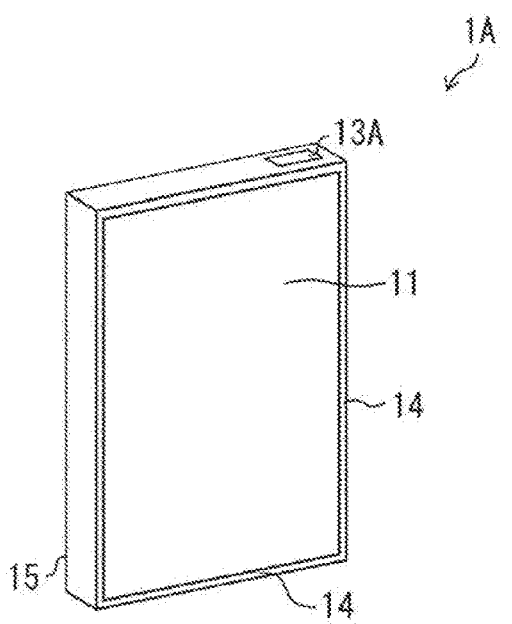
FIG. 4 is a schematic view illustrating required ideal arrangement of each member in a portable terminal apparatus.
Figure 5:
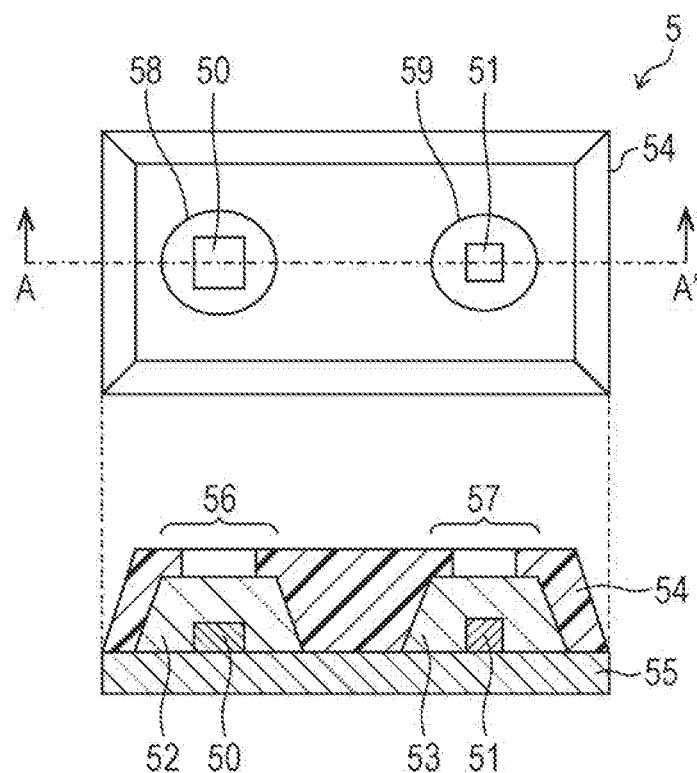
FIG. 5 is a front view of a conventional optical proximity sensor and a sectional view taken along a line A-A'.
Figure 6:
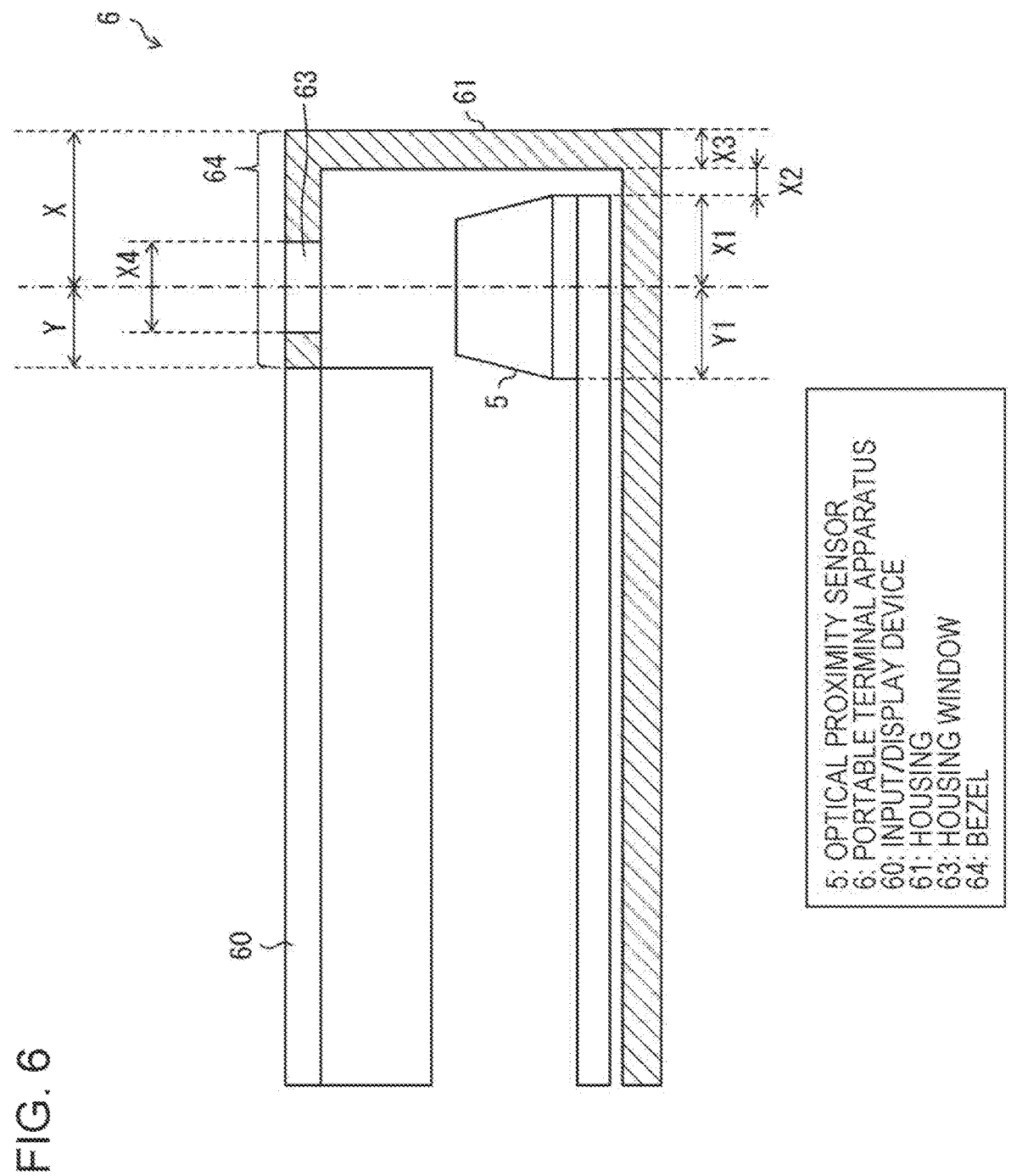
FIG. 6 is a sectional view of a portable terminal apparatus that is equipped with the conventional optical proximity sensor.
Figure 6A:
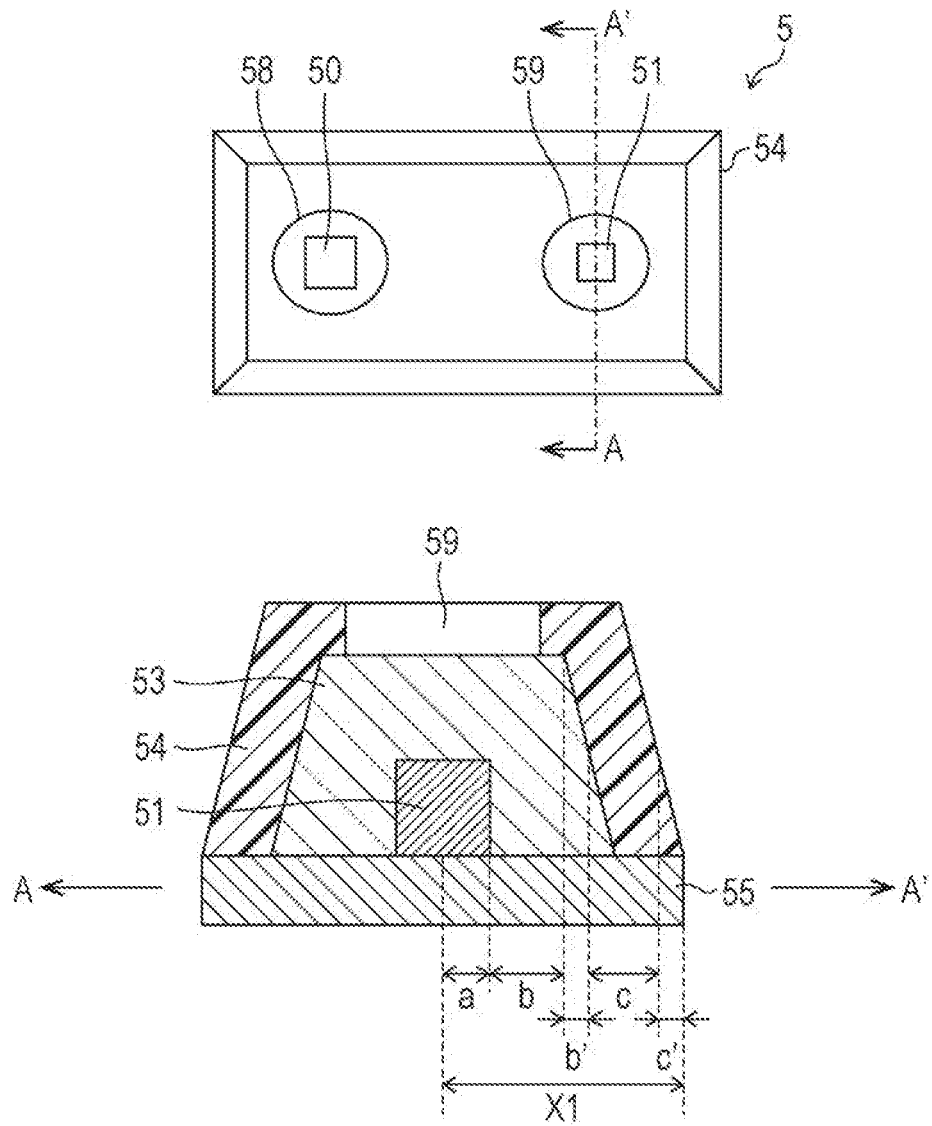
FIG. 6A is a front view of the conventional optical proximity sensor and a sectional view taken along a line A-A'.
Figure 6B:
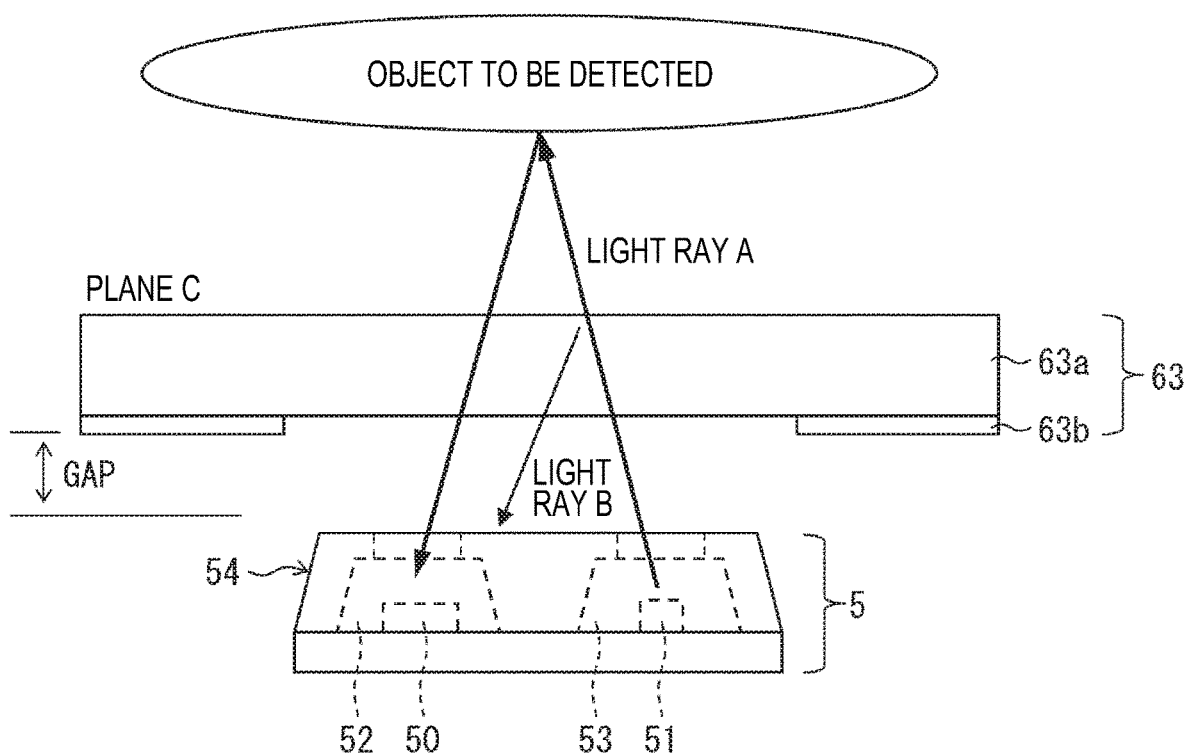
FIG. 6B is a schematic view illustrating a relationship between the optical proximity sensor and crosstalk light.
Figure 6C:
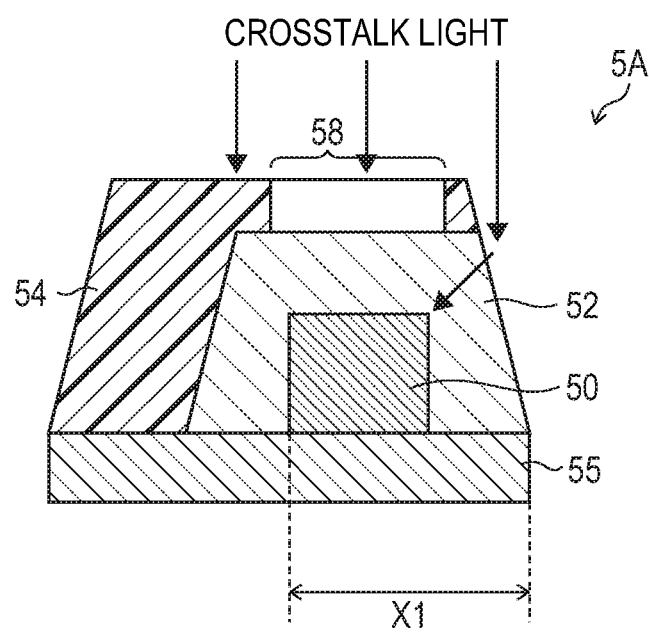
FIG. 6C is a sectional view in a case where a width X1 is reduced with use of the conventional optical proximity sensor.
Figure 10:
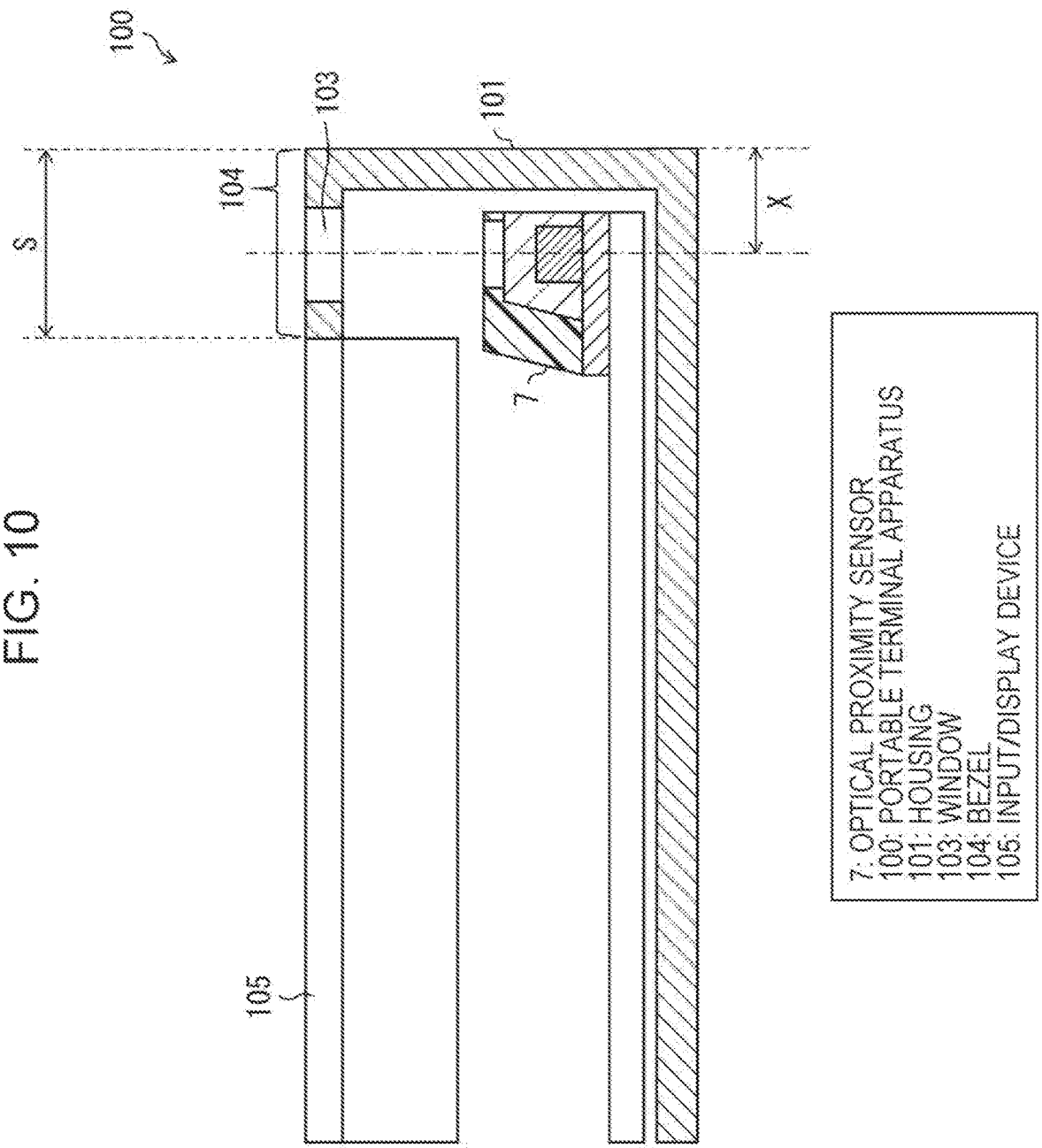
FIG. 10 is a sectional view of a portable terminal apparatus that is equipped with the optical proximity sensor of the invention

FIG. 10 is a sectional view of a portable terminal apparatus 100 that is equipped with the optical proximity sensor 7 of the invention. Portable terminal apparatus 100 of FIG. 10 is constituted by an input/display device 105, a housing 101, and the optical proximity sensor 7, and a window 103 is installed in a bezel part 104 of the housing 101. As described above, the optical proximity sensor 7 of the invention enables the package width X1 illustrated in FIG. 6 to be reduced. This makes it possible to reduce the width X from a peripheral edge of the housing 101 to a center of the housing window of the proximity sensor, and finally to narrow a width S of the bezel 104.

(Example of Configuration of Another Optical Proximity Sensor of Invention)

Figure 11:
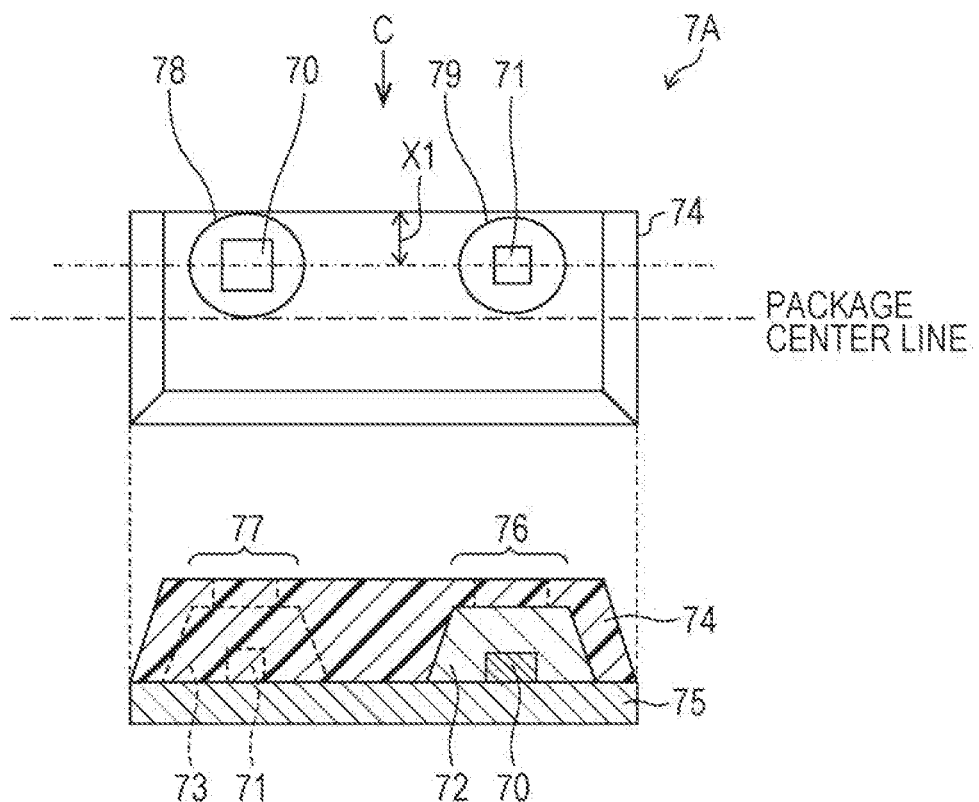
FIG. 11 is a front view; of an optical proximity sensor of the invention and a side view thereof as seen from a direction C.

FIG. 11 is a front view of an optical proximity sensor 7 of the invention and a side view thereof as seen from a direction C. Though the optical proximity sensor 7A has a fundamental configuration similar to that of the optical proximity sensor 7 illustrated in FIG. 7, the transparent resin 72 is exposed but the transparent resin 73 is not exposed from a side surface of a package of the optical proximity sensor 7A as illustrated in the side view.

A structure of the invention, it is possible to suppress the light receiving element 70 from receiving the light beam of the light emitting element 71 that has passed through the package side surface, and further increase in tolerance of the light detecting element 70 against noise light. Needless to say, to the contrary to the foregoing description, even when the transparent resin 72 is not exposed but the transparent resin 73 is exposed each from the side surface of the package of the optical proximity sensor 7A, there is no problem. However, in the optical proximity sensor, the light detecting IC described above is commonly used as the light detecting element, so that a size of the light detecting element becomes large as compared to that of a light emitting element, such as an LED or laser, which is able to use an element with a relatively small size. Thus, in order to further allow reduction of the width X1, it is better to cover the transparent resin 73, which covers the light emitting element 71, with the light-shielding resin 74.

(Molding Method of Another Optical Proximity Sensor of Invention)

Figure 12:
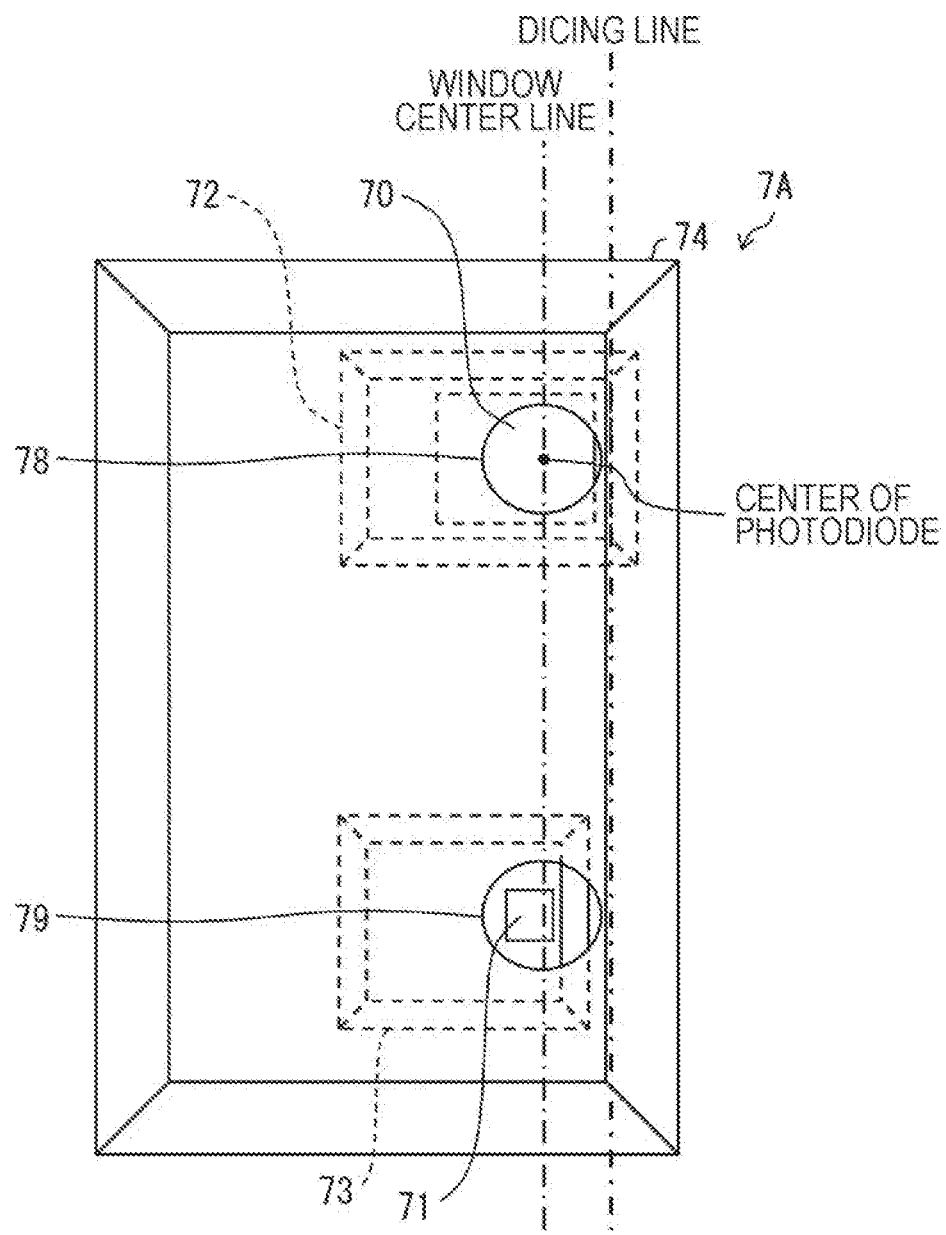
FIG. 12 is a schematic view illustrating the optical proximity sensor before dicing, which is molded by using the molding method of the optical proximity sensor of the invention.

FIG. 12 illustrates a molding method of the optical proximity sensor 7A illustrated in FIG. 11. In the optical proximity sensor 7A illustrated in FIG. 12, a center of a photodiode of the light detecting element 70 is arranged so as to be matched with a window center line connecting a center of the window 78 and a center of the window 79, and the light emitting element 71 is arranged so as to be deviated in a direction farther from the side surface of the package than the light detecting element 70. The light detecting element 70 and the light emitting element 71 are respectively covered with the transparent resin 72 and the transparent resin 73, edges of the transparent resin 72 and the transparent resin 73 are arranged so as to have different distances to the side surface of the package before dicing. Thereby, the configuration is provided so that only the transparent resin 72 of the light detecting unit 76 is exposed after molding of the package by dicing. The aforementioned arrangement enables easily covering of the side surface of the package of the light emitting unit 77 with the light-shielding resin 74 and reduction in the width X1.

Moreover, a configuration in which the transparent resin 73 of the light emitting unit 77 is exposed by bringing the light emitting element 71 close to the side surface of the package before dicing and keeping the light detecting element 72 away therefrom may be provided. That is, the transparent resin that is exposed from the side surface of the package in the optical proximity sensor 7A may be any one of the transparent resin 72 and the transparent resin 73. Furthermore, as long as a distance from the transparent resin 72 of the light detecting unit 76 to the side surface of the package before dicing and a distance from the transparent resin 73 of the light emitting unit 77 to the side surface of the package before dicing are able to be differentiated from each other, it is unnecessary to deviate the center of the light emitting element 71 or the center of the photodiode of the light detecting element 70.

(Example of Configuration of Still Another Optical Proximity Sensor of Invention)

Figure 13:
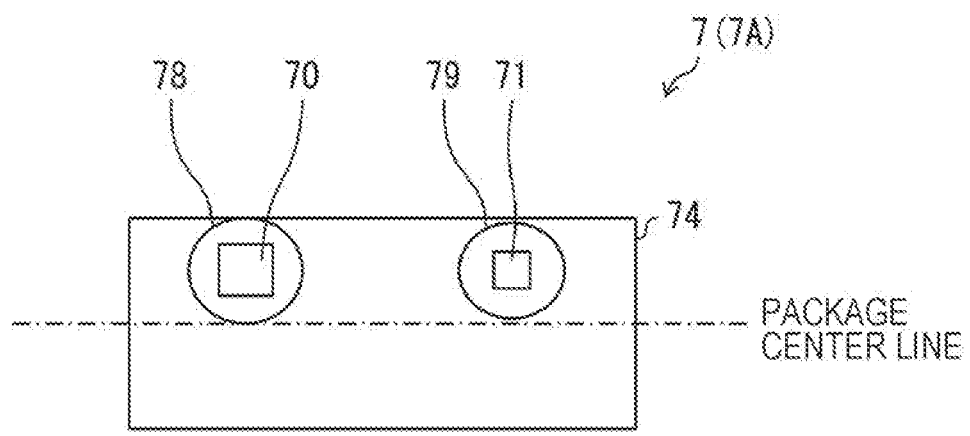
FIG. 13 is a front view of the optical proximity sensor of the invention.
Figure 14:
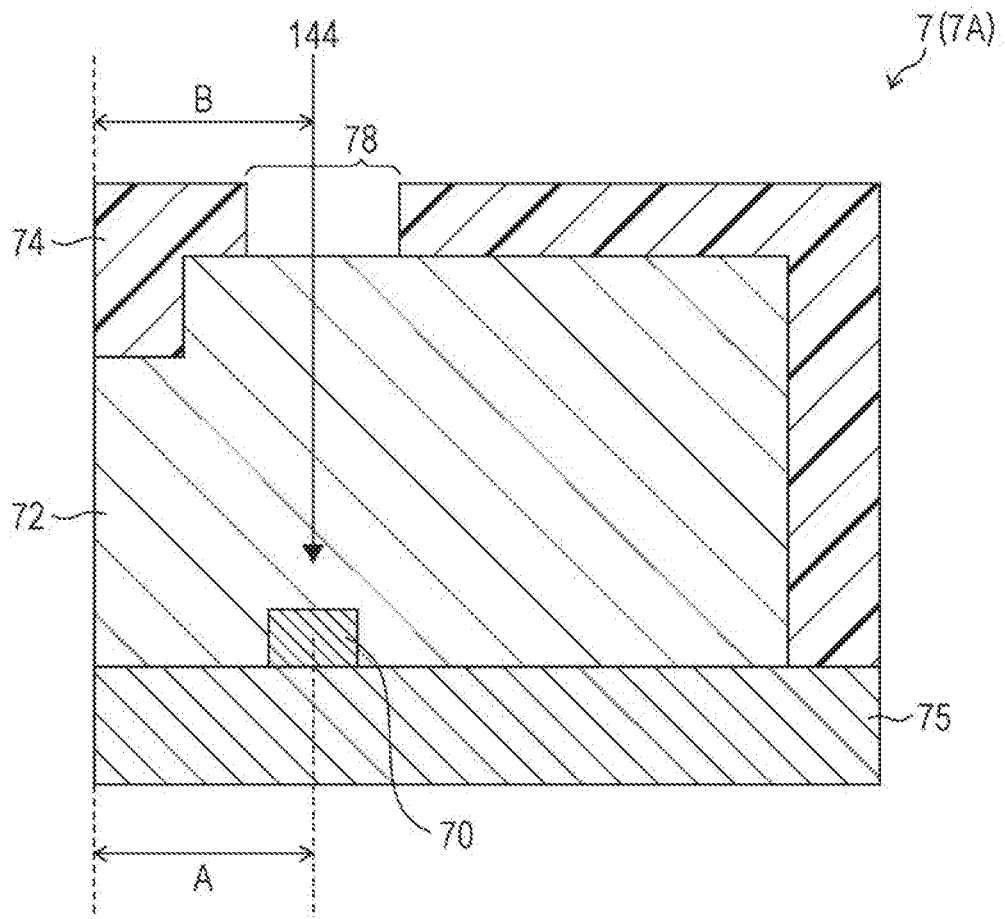
FIG. 14 is a sectional view of the optical proximity sensor of the invention.
Figure 15:
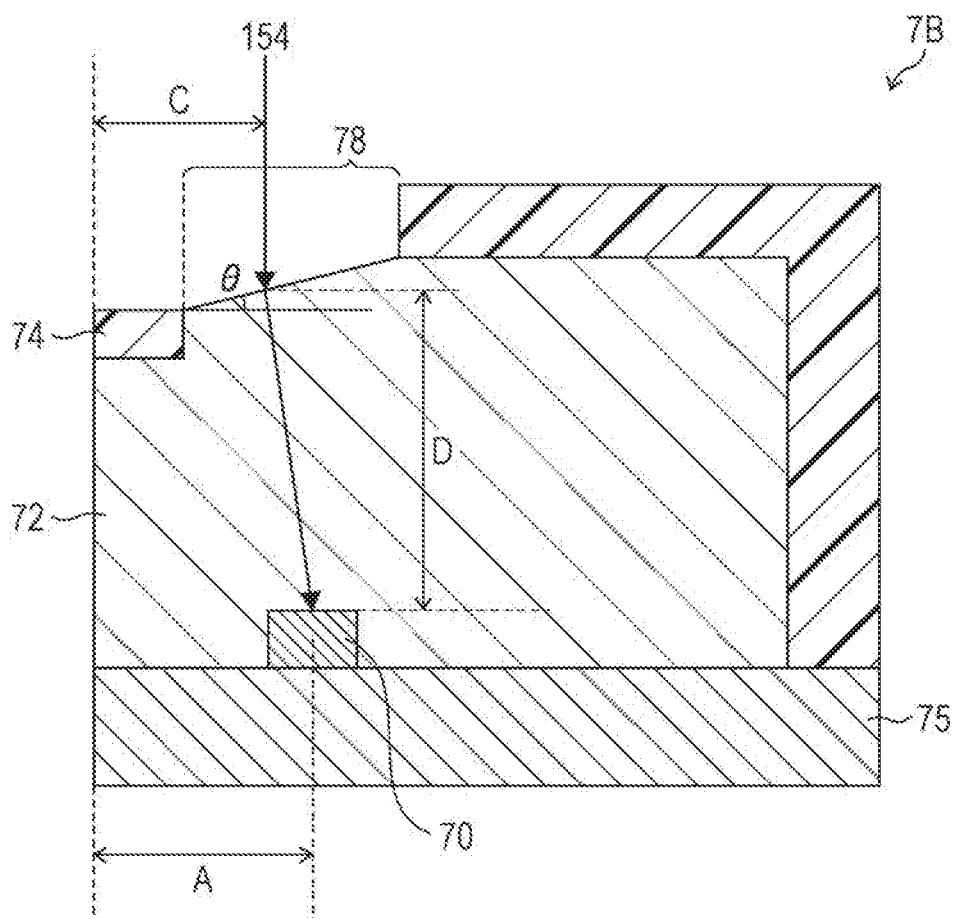
FIG. 15 is another sectional view of an optical proximity sensor of the invention.

FIGS. 13 to 15 illustrate another configuration of the optical proximity sensor of the invention. FIG. 13 is a view of the optical proximity sensor 7 or 7A of the invention described so far with use of FIG. 7 or 11, as seen from a top side. The light detecting element 70, the light emitting element 71, the window 78, and the window 79 are arrayed in the straight line, and are arranged near the side surface of the package. The light detecting element 70 and the window 78 are able to be arranged nearer to the side surface of the package than those in the example of FIG. 10, by a shape of the transparent resin 72, which corresponds to the window 78, on a side of the light detecting unit 76.

FIG. 14 illustrates an example of a sectional view of a periphery of the light detecting element of the optical proximity sensor 7 or 7A of the invention. In FIG. 14, the optical proximity sensor 7 or 7A has the light detecting element 70 covered with the transparent resin 72 as illustrated in FIG. 8, and the transparent resin 72 is covered with the light-shielding resin 74 except for a part that is exposed from the side surface of the package. A part of the light-shielding resin 74, which corresponds to the window 78, is open. A part of the transparent resin 72, which corresponds to the window 78, is horizontal to the substrate 75 and the straight line connecting the center of the window 78 and the center of the light detecting element 70 is perpendicular to the substrate 75. Here, it is assumed that a distance A from the center of the light detecting element 70 to the side surface of the package is a minimum vale that is able to be set. In a case of considering manufacturing variation or the like in a mounting position of the light detecting element 70, it is necessary that a position of the center of the window 78 is matched with a position of the center of the light detecting element 70 in the horizontal direction. Thus, A=B is provided, and a distance at which the light detecting element 70 is able to be arranged is decided according to A.

On the other hand. FIG. 15 is a sectional view of a periphery of a light detecting element of an optical proximity sensor 7B of the invention. In FIG. 15, the optical proximity sensor 7b has a configuration similar to that of the optical proximity sensor 7 or 7A, except that the transparent resin 72 and the light-shielding resin 74 have partially different shapes. In the optical proximity sensor 1B, the part of the transparent resin 72, which corresponds to the window 78, is structured to be inclined with respect to the light detecting element 70 so that an outer side of the package is at a low position and an inner side thereof is at a high position. In other words, the optical proximity sensor 7b includes the transparent resin 72 that has an incident surface with a predetermined angle θ with respect to the light detecting surface of the light detecting element 70 so that signal light 154 which is incident on the transparent resin 72 from the window 78 is incident on the light detecting element 70. In FIG. 15, the center of the window 78 is not matched with the center of the light detecting element 70 in the horizontal direction. Here, the distance A from the center of the light detecting element 70 to the side surface of the package is a minimum vale that is able to be set, similarly to FIG. 14.

Here, in the optical proximity sensor 7b of the invention, the transparent resin 72 that is positioned inside the window 78 is structured to be inclined so that that the outer side of the package is at a low position and the inner side thereof is at a high position. This structure allows the optical proximity sensor 7B to bend the signal light 154 to the inside of the package by refraction at an interface between the transparent resin 72 and the air. Thereby, the position of the center of the window 78 and the position of the center of the light detecting element 70 in the horizontal direction are able to be deviated from each other.

In the illustrated example, A is the distance from the center of the light detecting element 70 to the side surface of the package, and C is a distance from the center of the window 78 to the side surface of the package of the optical proximity sensor 7B in the horizontal direction. D is a distance from a position, at which the signal light 154 is incident on an incident surface of the transparent resin 72, to the light detecting surface of the light detecting element 70 in the vertical direction, and θ is a predetermined angle that is formed by the incident surface of the transparent resin 72 and the light detecting surface of the light detecting element 70. By setting the predetermined angle θ as illustrated in FIG. 15, distance A≤distance C is able to be satisfied consequently. At this time, it becomes possible to arrange the window 78 nearer to the side surface of the package.

Here, in a case where A=0.5 mm, D=1 mm, θ=30° are provided and a refraction index n of the transparent resin 72=1.5 is provided, C=0.3 mm is provided. In a case where A=0.5 mm is provided in FIG. 14, B=0.5 mm is provided by A=B. This indicates that the center of the window 78 is able to be arranged outward by 0.2 mm compared to that of the optical proximity sensor 7 or 7A of the invention. Accordingly, in the optical proximity sensor 7B of the invention, it is possible to further narrow a width of the bezel.

Moreover, in a portable terminal apparatus, such as a smartphone, which is equipped with the optical proximity sensor 7B of the invention, a bezel-less structure is allowed and design of terminal equipment is able to be improved.

As described above, the optical proximity sensor 7, 7A, or 7B of the invention has a structure in which at least any of the transparent resin 72 and the transparent resin 73 is exposed from the side surface of the package, so that the light detecting element 70, the light emitting element 71, the window 78, and the window 79 are able to be arranged nearer to the side surface of the package. Moreover, the structure in which the side surface of the package is perpendicular to the substrate 75 and only any one of the light detecting unit 76 and the light emitting unit 77 has the transparent resin exposed makes it possible to achieve excellent crosstalk characteristics. Furthermore, the optical proximity sensor 7, 7A, or 7B of the invention is mounted on a portable terminal apparatus such as a smartphone, so that the bezel-Less structure by which a width of a bezel of the portable terminal apparatus is narrowed is allowed and stable proximity characteristics are able to be provided. Note that, the optical proximity sensor 7, 7A, or 7B of the invention requires no mirror differently from that of PTL 1, and thus enables arrangement of the light detecting element or the like near the side surface of the package with a simple configuration. Moreover, according to PTL 2, a window and a light detecting element are consequently arranged near a side surface of a package for convenience of element arrangement, but when calculation is performed in accordance with the configuration of PTL 2 with use of a dimension described in the invention, a distance from the side surface of the package to the center of the light emitting element or the window is about 0.9 mm. Thus, the configuration of PTL 2 has no clear difference from a case where the conventional optical proximity sensor is used.

(Modified Example)

In the optical proximity sensor 7, 7A, or 7B of the invention, the transparent resin 72 and the transparent resin 73 may be formed of any material as long as signal light is able to be transmitted. The transparent resin 72 and the transparent resin 73 may be, for example, synthetic resin such as plastic, or may be a transparent material such as glass. Similarly, the light-shielding resin 74 may be formed of any material as long as various kinds of light including the signal light are able to be shielded. The light-shielding resin 74 may be, for example, synthetic resin such as plastic, or may be a material such as metal.

Note that, the optical proximity sensor 7, 7A, or 7B of the invention may have a configuration in which not only the transparent resin 72 or the transparent resin 73 but also the light detecting element 70 or the light emitting element 71 is exposed from the side surface of the package. Moreover, the side surface of the package may be covered by any material after dicing described with use of FIGS. 9(b) and 12 is performed. Furthermore, the side surface of the package may be configured to be perpendicular to the window 78.

Moreover, in the optical proximity sensor 7, 7A, or 7B of the invention, the light detecting element 70 and the light emitting element 71 may be respectively arranged so that the light detecting surface and the light emitting surface have a predetermined angle with respect to a horizontal plane of the substrate 75. At this time, the incident surface of the transparent resin 72 and an output surface of the transparent resin 73 may be formed in consideration of the angle of the light detecting surface and the light emitting surface.

[Conclusion]

An optical proximity sensor (7, 7A, 7B) according to an aspect 1 of the invention is an optical proximity sensor that includes: a light detecting unit (76) and a light emitting unit (77), in which the light detecting unit is constituted by a light detecting element (70) installed on a substrate (75), a first transparent unit (transparent resin 72) that covers the light detecting element, and a light-shielding unit (light-shielding resin 74) that covers the first transparent unit, the light emitting unit is constituted by a light emitting element (71) installed on the substrate, a second transparent unit (transparent resin 73) that covers the light emitting element, and the light-shielding unit that covers the second transparent unit, the light detecting element and the light emitting element detect and emit signal light respectively through a first window (window 78) and a second window (window 79), which are provided in the light-shielding unit and on an upper-side of a package of the optical proximity sensor, and the light-shielding unit causes at least any of the first transparent unit and the second transparent unit to be exposed from a side surface of the package.

According to the aforementioned configuration, in the optical proximity sensor, at least any of the first transparent unit and the second transparent unit is exposed. Thereby, for example, at least any of the light detecting element and the light emitting element is able to be arranged near a peripheral edge portion of the optical proximity sensor without considering a width of the light-shielding unit. Then, in a case where the optical proximity sensor is incorporated in a portable terminal apparatus, it is possible to arrange the optical proximity sensor so that at least any of the light detecting element and the light emitting element is arranged to be positioned near an outermost periphery of the portable terminal apparatus. Accordingly, the optical proximity sensor in which the light emitting element or the light detecting element is arranged near the peripheral edge portion and which increases a degree of freedom in an arrangement position is able to be realized.

The optical proximity sensor (7, 7A, 7B) according to an aspect 2 of the invention may have a configuration in which the side surface of the package is constituted by a plane perpendicular to the substrate, in the aspect 1.

According to the aforementioned configuration, the side surface from which at least any of the first transparent unit and the second transparent unit is exposed is formed by the side surface perpendicular to the substrate. Thereby, for example, in a case where the substrate is arranged perpendicularly to a direction in which light is incident, the optical proximity sensor is able to be arranged so that the light is not incident on the light detecting element from the side surface, and tolerance against stray light or the like is able to be increased. Moreover, it is possible to achieve both suppression of erroneous detection caused by crosstalk light and space-saving.

The optical proximity sensor (7, 7A, 7B) according to an aspect 3 of the invention may have a configuration in which the side surface is constituted by a plane perpendicular to the first window (window 78), in the aspect 1 or 2.

According to the aforementioned configuration, the side surface from which at least any of the first transparent unit and the second transparent unit is exposed is formed by the side surface perpendicular to the first window. Thereby, for example, in a case where the window is arranged perpendicularly to a direction in which light is incident, the optical proximity sensor is able to be arranged so that the light is not incident on the light detecting element from the side surface, and tolerance against stray light or the like is able to be increased. Moreover, it is possible to achieve both suppression of erroneous detection caused by crosstalk light and space-saving.

The optical proximity sensor (7, 7A, 7B) according to an aspect 4 of the invention may have a configuration in which the first transparent unit (transparent resin 72) is exposed from the side surface, in any of the aspects 1 to 3.

According to the aforementioned configuration, in the side surface from which at least any of the first transparent unit and the second transparent unit is exposed, the first transparent unit is not covered with the light-shielding unit and exposed. This makes it possible to arrange the light detecting element and the first window nearer to the side surface of the package and increase the tolerance against stray light. For example, since the light detecting element is able to be arranged toward the peripheral edge portion of the optical proximity sensor by an amount of a thickness of the light-shielding unit, the optical proximity sensor is able to be arranged, for example, near an outermost periphery of a portable terminal apparatus without restriction in the thickness of the light-shielding unit.

The optical proximity sensor (7B) according to an aspect 5 of the invention may have a configuration in which the first transparent unit (transparent resin 72) has an incident surface with a predetermined angle with respect to a light detecting surface of the light detecting element such that the signal light incident on the first transparent unit through the first window (window 78) is incident on the light detecting element (70), in any of the aspects 1 to 4.

According to the aforementioned configuration, the light which is incident on the first transparent unit through the first window is able to be incident on the light detecting element after being refracted by the incident surface. This makes it possible to arrange the light detecting element and the first window nearer to the side surface of the package. Furthermore, the first window and the light detecting element are able to be arranged to be deviated from each other.

A portable terminal apparatus (100) according to an aspect 6 of the invention may be configured to include the optical proximity sensor (7, 7A, 7B) according to any of the aspects 1 to 5. According to the aforementioned configuration, an effect similar to that of the aspect 1 is able to be exerted.

The invention is not limited to each of Embodiments described above and may be modified in various manners within the scope of the claims and an embodiment achieved by appropriately combining technical means disclosed in each of different embodiments is also encompassed in the technical scope of the invention. Further, by combining the technical means disclosed in each of the embodiments, a new technical feature may be formed.

REFERENCE SIGNS LIST

7, 7A, 7B optical proximity sensor
70 light detecting element
71 light emitting element
72 transparent resin (first transparent unit)
73 transparent resin (second transparent unit)
74 light-shielding resin (light-shielding unit)
75 substrate
76 light detecting unit
77 light emitting unit
78 window (first window)
79 window (second window)
100 portable terminal apparatus

The invention claimed is:

1. An optical proximity sensor comprising: a light detecting unit and a light emitting unit, wherein the light detecting unit comprises a light detecting element installed on a substrate, a first transparent unit that covers the light detecting element, and a light-shielding unit that covers the first transparent unit, the light emitting unit comprises a light emitting element installed on the substrate, a second transparent unit that covers the light emitting element, and the light-shielding unit that covers the second transparent unit, the light detecting element and the light emitting element detect and emit signal light respectively through a first window and a second window, which are provided in the light-shielding unit and on an upper side of a package of the optical proximity sensor, the light-shielding unit having a first side surface and a second side surface of the package, the second side surface facing the first side surface, wherein
one of the first transparent unit and the second transparent unit is exposed on the first side surface,
the other one of the first transparent unit and the second transparent unit is covered by the light-shielding unit on the first side surface,
both of the first transparent unit and the second transparent unit are covered by the light-shielding unit on the second side surface, and
the light detecting element and the light emitting element are installed on the substrate so that a straight line connecting the light detecting element and the light emitting element is positioned nearer to the first side surface than to the second side surface.

2. The optical proximity sensor according to claim 1, wherein the first side surface of the package comprises a plane perpendicular to the substrate.

3. The optical proximity sensor according to claim 1, wherein the first side surface comprises a plane perpendicular to the first window.

4. The optical proximity sensor according to claim 1, wherein the first transparent unit is exposed from the first side surface.

5. The optical proximity sensor according to claim 1, wherein the first transparent unit has an incident surface with a predetermined angle with respect to a light detecting surface of the light detecting element such that the signal light incident on the first transparent unit through the first window is incident on the light detecting element.

6. A portable terminal apparatus comprising the optical proximity sensor according to claim 1.

* * * * *